(12) United States Patent
Yang et al.

(10) Patent No.: US 9,046,217 B2
(45) Date of Patent: Jun. 2, 2015

(54) AUTOMATIC LUBRICANT DISPENSING DEVICE

(71) Applicant: Shenzhen China Star Optoelectronics Technology Co., Ltd., Shenzhen, Guangdong (CN)

(72) Inventors: Weibing Yang, Shenzhen (CN); Chunhao Wu, Shenzhen (CN); Kunhsien Lin, Shenzhen (CN); Yongqiang Wang, Shenzhen (CN); Zhiyou Shu, Shenzhen (CN); Minghu Qi, Shenzhen (CN); Zenghong Chen, Shenzhen (CN); Zhenhua Guo, Shenzhen (CN); Yunshao Jiang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 337 days.

(21) Appl. No.: 13/703,703

(22) PCT Filed: Nov. 15, 2012

(86) PCT No.: PCT/CN2012/084709
§ 371 (c)(1),
(2) Date: Dec. 12, 2012

(87) PCT Pub. No.: WO2014/063395
PCT Pub. Date: May 1, 2014

(65) Prior Publication Data
US 2014/0116805 A1    May 1, 2014

(30) Foreign Application Priority Data
Oct. 26, 2012   (CN) .......................... 2012 1 0416151

(51) Int. Cl.
*F16N 13/22*        (2006.01)

(52) U.S. Cl.
CPC ..................................... *F16N 13/22* (2013.01)

(58) Field of Classification Search
CPC ....................................................... F16N 13/22
USPC ............................................................. 184/6
See application file for complete search history.

(56) References Cited

U.S. PATENT DOCUMENTS 3,424,022 A * 1/1969 Greenberg et al. ............. 74/409
3,822,607 A * 7/1974 Tharaldsen ..................... 74/468
(Continued)

*Primary Examiner* — William E Dondero
*Assistant Examiner* — Mark K Buse
(74) *Attorney, Agent, or Firm* — Andrew C. Cheng

(57) ABSTRACT

The present invention provides an automatic lubricant dispensing device, which comprises the following elements. A bracket is provided. A lubricant supplying device is mounted on a first end of the bracket. A dispensing gear is disposed on a second end of the bracket. A guiding arrangement is moveably mounted on the bracket, and including a pair of guiding rollers arranged coplanarly. Wherein a space is defined between the dispensing gear and the pair of guiding rollers in which a rack to be lubricated can fit therein, and the dispensing gear is adapted to mesh with the rack to be lubricated. Wherein the lubricant supplying device evenly dispenses the lubricant over the teeth of the rack by the dispensing gear which is completely and thoroughly meshed with the rack and transferred with lubricant from the lubricant supplying device. It is convenient, no need of labors and saving a lot of time. In addition, the lubricant can be evenly distributed to all the surface of the rack. In addition, the provision of the automatic dispensing device largely reduce the difficulty and time in lubricating the rack with dust free lubricant. A great deal of manpower and time has been saved. The environmental quality of the clean room has also been upgraded.

15 Claims, 3 Drawing Sheets

(56) References Cited

U.S. PATENT DOCUMENTS

| | | | |
|---|---|---|---|
| 4,653,610 A * | 3/1987 | Tamura et al. | 184/6.12 |
| 5,622,239 A * | 4/1997 | Orlitzky | 184/6.12 |
| 6,253,877 B1 * | 7/2001 | Yang | 184/6.3 |
| 8,196,489 B2 * | 6/2012 | Paluncic et al. | 74/468 |
| 2010/0129013 A1 * | 5/2010 | Schroeder et al. | 384/45 |
| 2012/0090415 A1 * | 4/2012 | Lim | 74/89.17 |

* cited by examiner

AUTOMATIC LUBRICANT DISPENSING DEVICE

CROSS REFERENCE

This application is claiming a priority arisen from a patent application, entitled with "Automatic Lubricant Dispensing Device", submitted to China Patent Office on Oct. 26, 2012, designated with an Application Number 201210416151.6. The whole and complete disclosure of such patent application is hereby incorporated by reference.

FIELD OF THE INVENTION

The present invention relates to a lubricant dispensing device, and more particularly, to an automatic lubricant dispensing device for rack.

DESCRIPTION OF PRIOR ART

In the semi-conductor manufacturing industry, many semi-conductor products or final products have to be transferred by means of automatic carrier or vehicle, and there are a lost of such automatic carries or vehicles. Most of the automatic vehicles are driven by a combination of pinion and rack so as to move it to and fro. As a result, the rack has to be cleaned and then lubricated with grease frequently so as to keep it functioning. For example, in certain workstation, the rack and pinion have to be cleaned and adjusted every three months.

Currently, the cleaning and lubrication of the rack and pinion are done manually, and this really takes a great deal of time and labors as well. In addition, when it is done manually, the quantity of the lubricant or grease dispensed to each rack and pinion will be varied from technician to technician, and the distribution of the lubricant over the rack will also vary from technician to technician. Occasionally, the dust free lubricant or grease dispensed onto the peaks of the teeth of the rack and the pinion are accumulated locally, and once it is operated, those lubricant or grease can be readily casted into the air because of the centrifugal force and which can consequently contaminate the clean room. In addition, once the lubricant or grease ran out because of the rotational movement of the pinion, poor lubrication between the rack and pinion will be encountered.

SUMMARY OF THE INVENTION

It is an object of the present invention to provide a technical solution to the problem encountered by the prior art by providing an automatic lubricant dispensing device which automatically dispenses lubricant to the rack and associated pinion. It is quick and convenient with excellent performance.

In order to resolve the prior art issue, the present invention provides an automatic lubricant dispensing device, which comprises the following elements.

A bracket is provided.

A lubricant supplying device is mounted on a first end of the bracket.

A dispensing gear is disposed on a second end of the bracket.

A guiding arrangement is moveably mounted on the bracket, and including a pair of guiding rollers arranged coplanarly.

Wherein a space is defined between the dispensing gear and the pair of guiding rollers in which a rack to be lubricated can fit therein, and the dispensing gear is adapted to mesh with the rack to be lubricated.

Wherein the lubricant supplying device evenly dispenses lubricant over the teeth of the rack by the dispensing gear which is properly meshed with the rack.

Wherein the lubricant supplying device includes a lubricant reservoir is provided and with lubricant stored therein.

A lubricant pump is provided for pumping the lubricant out of the reservoir.

A conduit is coupled to the pump so as to dispense a lubricant.

A flat nozzle is terminated to the conduit for dispensing lubricant to the dispensing gear for which is closely in contact.

Wherein the device further comprises the following.

A linkage is provided and has one end in contact with a sidewall of the dispensing gear, and the other end interconnected to the pump such that when the dispensing gear moves, the pump is activated so as to pump out the lubricant.

Wherein a regulator is arranged between the linkage and the dispensing gear so as to adjust a distance between a joint between the linkage and the dispensing gear to a center of the dispensing gear so as to regulate the dispensing quantity of the pump.

Wherein the guiding arrangement includes the following.

A chassis is moveably mounted onto a guiding slot of the bracket; the pair of guiding rollers is mounted onto a pair of transaxles on the chassis.

Wherein the guiding rollers and the dispensing gear are coplanar.

Wherein the chassis further includes an idle roller arranged horizontally and which abuts against to a sidewall of the rack so as to keep an intimate contact between the dispensing gear and the rack.

Wherein the bracket and the chassis are arranged with an adjusting device therebetween so as to regulate the distance between the pair of rollers and the dispensing gear making the guiding rollers in closely contact with a bottom surface of the rack so as to keep the dispensing gear and the rack in close relationship.

Wherein the adjusting device is a rubber band of heavy duty.

Wherein the chassis is provided with a handle so as to maneuver the chassis manually.

Correspondingly, the present invention provides an automatic lubricant dispensing device, which comprises a bracket.

A lubricant supplying device is mounted on a first end of the bracket.

A dispensing gear is disposed on a second end of the bracket.

A guiding arrangement is moveably mounted on the bracket, and including a pair of guiding rollers arranged coplanarly.

Wherein a space is defined between the dispensing gear and the pair of guiding rollers in which a rack to be lubricated can fit therein, and the dispensing gear is adapted to mesh with the rack to be lubricated.

Wherein the lubricant supplying device further includes the following elements.

A lubricant reservoir is provided with lubricant stored therein.

A lubricant pump is provided for pumping the lubricant out of the reservoir.

A conduit is coupled to the pump so as to dispense the lubricant.

A flat nozzle terminated to the conduit for dispensing lubricant to the dispensing gear for which is closely in contact.

Wherein the lubricant supplying device evenly dispenses a lubricant over the teeth of the rack by the dispensing gear which is properly meshed with the rack.

Wherein the device further comprises the following.

A linkage is provided and has one end in contact with a sidewall of the dispensing gear, and the other end interconnected to the pump such that when the dispensing gear moves, the pump is activated so as to pump out the lubricant.

Wherein a regulator is arranged between the linkage and the dispensing gear so as to adjust a distance between a joint between the linkage and the dispensing gear to a center of the dispensing gear so as to regulate the dispensing quantity of the pump.

Wherein the guiding arrangement includes the following.

A chassis is moveably mounted onto a guiding slot of the bracket; the pair of guiding rollers is mounted onto a pair of transaxles on the chassis.

Wherein the guiding rollers and the dispensing gear are coplanar.

Wherein the chassis further includes an idle roller arranged horizontally and which abuts against to a sidewall of the rack so as to keep an intimate contact between the dispensing gear and the rack.

Wherein the bracket and the chassis are arranged with an adjusting device therebetween so as to regulate the distance between the pair of rollers and the dispensing gear making the guiding rollers in closely contact with a bottom surface of the rack so as to keep the dispensing gear and the rack in close relationship.

Wherein the adjusting device is a rubber band of heavy duty.

Wherein the chassis is provided with a handle so as to maneuver the chassis manually.

Correspondingly, the present invention provides an automatic lubricant dispensing device which comprises the following.

A bracket is provided.

A lubricant supplying device is mounted on a first end of the bracket.

A dispensing gear is disposed on a second end of the bracket.

A guiding arrangement is moveably mounted on the bracket, and includes the followings.

A chassis is moveably mounted onto a guiding slot of the bracket.

A pair of guiding rollers is mounted onto a pair of transaxles on the chassis, wherein the guiding rollers and the dispensing gear are coplanar.

Wherein a space is defined between the dispensing gear and the pair of guiding rollers in which a rack to be lubricated can fit therein, and the dispensing gear is adapted to mesh with the rack to be lubricated.

Wherein the lubricant supplying device evenly dispenses a lubricant over the teeth of the rack by the dispensing gear which is properly meshed with the rack.

Wherein the lubricant supplying device further includes the following elements.

A lubricant reservoir is provided with lubricant stored therein.

A lubricant pump is provided for pumping the lubricant out of the reservoir.

A conduit is coupled to the pump so as to dispense the lubricant.

A flat nozzle terminated to the conduit for dispensing lubricant to the dispensing gear for which is closely in contact.

Wherein the device further comprises the following.

A linkage is provided and has one end in contact with a sidewall of the dispensing gear, and the other end interconnected to the pump such that when the dispensing gear moves, the pump is activated so as to pump out the lubricant.

Wherein a regulator is arranged between the linkage and the dispensing gear so as to adjust a distance between a joint between the linkage and the dispensing gear to a center of the dispensing gear so as to regulate the dispensing quantity of the pump.

The present invention can be concluded with the following advantages.

According to the embodiments of the present invention, with the provision of the automatic lubricant dispensing device, the lubricant can be automatically and evenly dispensed to the surface of the teeth of the rack. It is convenient, no need of labors and saving a lot of time. In addition, the lubricant can be evenly distributed to all the surface of the rack.

In addition, a regulator is provided to accurately adjust the output of the lubricant dispensed to the rack. Accordingly, the lubricant is administered economically and efficiently. No waste at all!

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings.

DETAILED DESCRIPTION OF PREFERRED EMBODIMENT

Detailed description will be given in view of the accompanied drawings.

Figure 1:
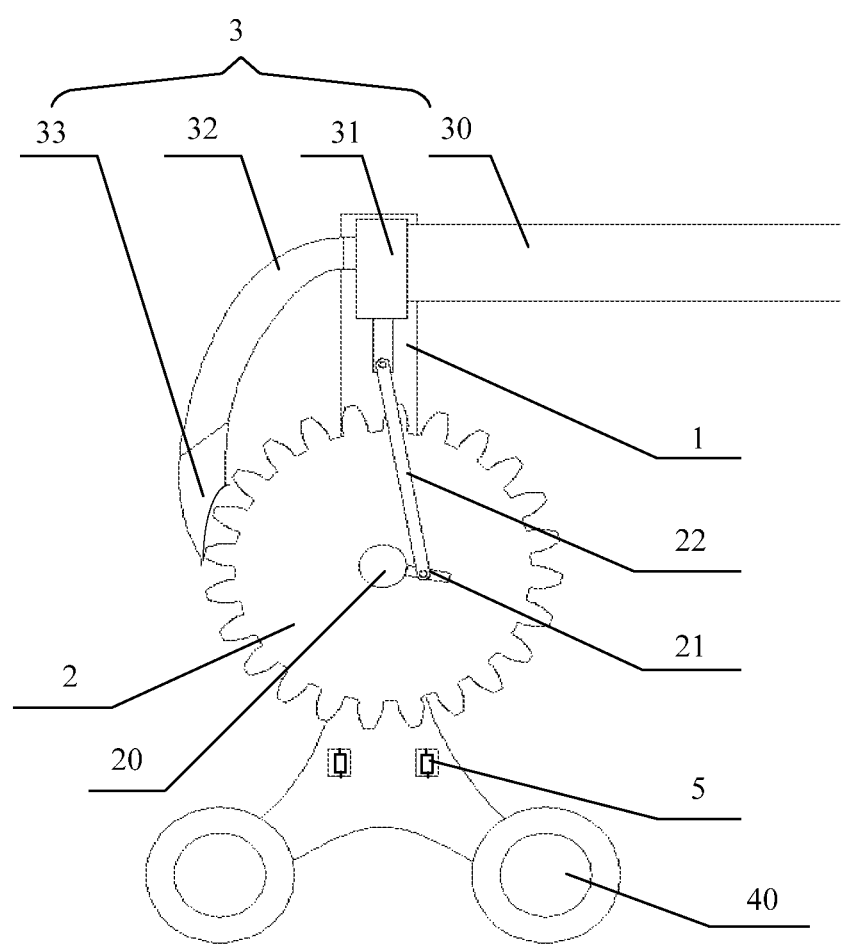
FIG. 1 is an illustrational and bottom view of an automatic lubricant dispensing device made in accordance with the present invention.
Figure 2:
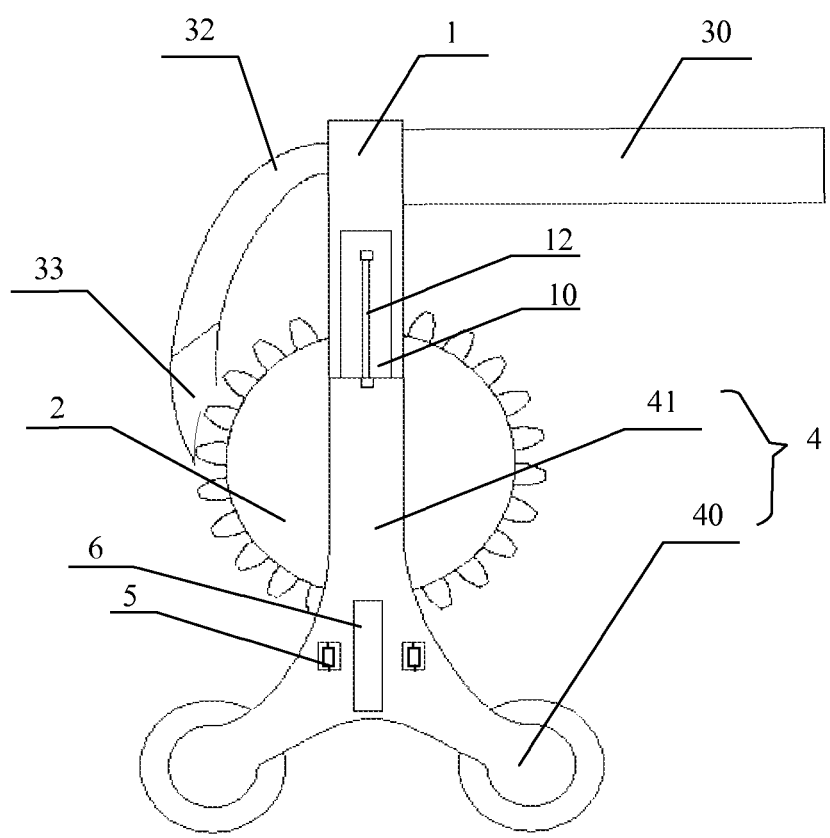
FIG. 2 is an illustrational and top view of an automatic lubricant dispensing device made in accordance with the present invention.
Figure 3:
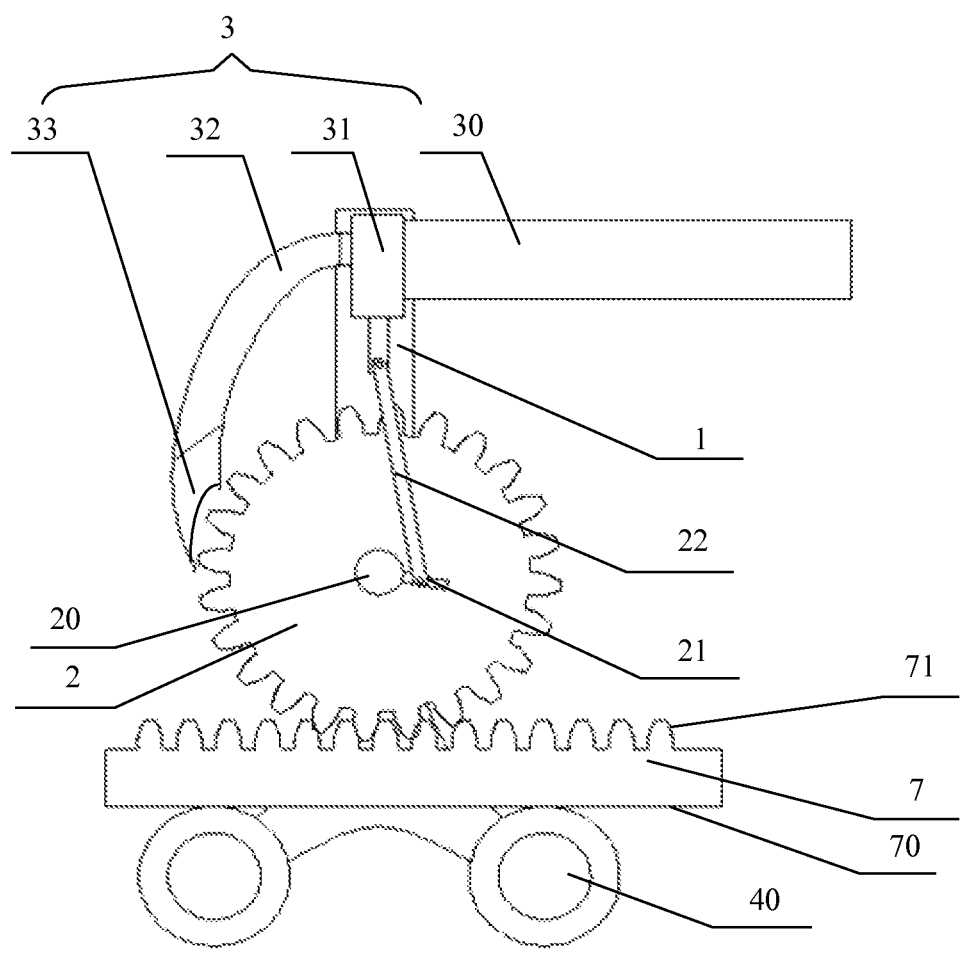
FIG. 3 is an illustrational view showing how the automatic lubricant dispensing device works.

Referring to FIGS. 1 to 3, which disclose the automatic lubricant dispensing device. It can be readily seen that the device includes the following elements.

A bracket 1 is provided.

A lubricant supplying device 3 is mounted on a first end of the bracket 1.

A dispensing gear 2 is disposed on a second end of the bracket 1.

A guiding arrangement 4 is moveably mounted on the bracket 1, and which is mounted on a different surface of the bracket 1. The guiding arrangement 4 includes a pair of guiding rollers 40 arranged coplanarly.

Wherein a space is defined between the dispensing gear 2 and the pair of guiding rollers 4 in which a rack 7 to be lubricated can fit therein, and the dispensing gear 2 is adapted to mesh with the rack 7 to be lubricated.

Wherein the lubricant supplying device 3 evenly dispenses the lubricant over the teeth of the rack 7 by the dispensing gear 2 which is completely and thoroughly meshed with the rack 7 and transferred with lubricant from the lubricant supplying device 3B.

Wherein the lubricant supplying device 3 includes the following elements.

A lubricant reservoir 30 is provided and with lubricant stored therein. If the rack 7 is working in a dust free environment, then the lubricant should be also dust free lubricant.

A lubricant pump 31 is provided for pumping the lubricant out of the reservoir 30. The pump 31 has a piston configuration for pushing out of the lubricant from the reservoir 30.

A conduit 32 is coupled to the pump 31 so as to dispense the lubricant from the pump 31.

A flat nozzle 33 is terminated to the conduit 32 for dispensing lubricant to the dispensing gear 2 for which is closely in contact.

Wherein the dispensing gear 2 further comprises a linkage 22 and has one end in contact with a sidewall of the dispensing gear 2, and the other end interconnected to the pump 31 such that when the dispensing gear 2 moves, the pump 31 is activated to drive the piston therein so as to pump out the lubricant from the reservoir 30.

Wherein a regulator 21 is arranged between the linkage 22 and the dispensing gear 2 so as to adjust a distance between a joint between the linkage 22 and the dispensing gear to a center 20 of the dispensing gear 2 so as to regulate the dispensing quantity of the pump 31 by adjusting the displacement of the piston within the pump 31.

Wherein the guiding arrangement 4 includes the following.

A chassis 41 is moveably mounted onto a guiding slot of the bracket 1.

At least a pair of guiding rollers 40 is mounted onto a pair of transaxles on the chassis 41. The guiding rollers 40 are substantially coplanar with the dispensing gear 2.

Wherein the chassis 41 further includes an idle roller 5 arranged horizontally and which abuts against to a sidewall of the rack 7 so as to keep an intimate contact between the dispensing gear 2 and the rack 7 during operation. With the provision of the idle roller 5 to provide a rolling support, a slight push will drive the dispensing gear 2 to move forward. As a result, the lubricant can be easily dispensed, and the efficiency can be increased.

Wherein the bracket 1 and the chassis 41 are arranged with an adjusting device 12 therebetween so as to regulate the distance between the pair of rollers 40 and the dispensing gear 2 making the guiding rollers 40 in closely contact with a bottom surface 70 of the rack 7 so as to keep the dispensing gear 2 and the teeth 71 of the rack 7 in close relationship. In one of the preferred embodiment, the adjusting device 12 is a rubber band of heavy duty.

Wherein the chassis 41 is provided with a handle 6 so as to maneuver the chassis manually. As a result, by merely maneuvering the handle 6, the lubricant supplying device can be readily moved.

The working principle of the automatic lubricant dispensing device will be illustrated and explained herebelow. Firstly, the rack 7 to be lubricated will be disposed between the space defined by the dispensing gear 2 and the guiding rollers 40. With the function of the rubber band, the guiding rollers 40 heavily abut against the bottom 70 of the rack 7 such that the dispensing gear 2 are closely meshed with the teeth 71 of the rack. By maneuvering the handle 6, and lubricant supplying device can be readily moved along the rack 7. Meanwhile, the dispensing gear 2 is driven by the rack 7, and the rotation of the dispensing gear 2 will manipulate the linkage 22 so as to displace the piston of the pump 31. As a result, the lubricant stored within the reservoir 30 will be dispensed to the conduit 32, which is further flown to the flat nozzle 33 through the conduit 32, and further evenly distributed over the teeth 71 of the rack 7 along the rotation of the dispensing gear 2. By this arrangement, the lubricant can be evenly distributed over the teeth 71 of the rack 7 efficiently and evenly. By repeating the process, the rack 7 can be properly lubricated.

It can be readily seen that according to the embodiments of the present invention, with the provision of the automatic lubricant dispensing device, the lubricant can be automatically and evenly dispensed to the surface of the teeth of the rack. It is convenient, no need of labors and saving a lot of time. In addition, the lubricant can be evenly distributed to all the surface of the rack. In addition, the provision of the automatic dispensing device largely reduce the difficulty and time in lubricating the rack with dust free lubricant. A great deal of manpower and time have been saved. The environmental quality of the clean room has also been upgraded.

In addition, a regulator is provided to accurately adjust the output of the lubricant dispensed to the rack. Accordingly, the lubricant is administered economically and efficiently. No waste at all!

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. An automatic lubricant dispensing device, comprising:
a bracket;
a lubricant supplying device mounted on a first end of the bracket;
a dispensing gear disposed on a second end of the bracket;
a guiding arrangement moveably mounted on the bracket, and including a pair of guiding rollers arranged coplanarly;
wherein a space is defined between the dispensing gear and the pair of guiding rollers in which a rack to be lubricated can fit therein, and the dispensing gear is adapted to mesh with the rack to be lubricated;
wherein the lubricant supplying device evenly dispenses a lubricant over teeth of the rack by the dispensing gear which is properly meshed with the rack;
wherein the lubricant supplying device includes a lubricant reservoir with the lubricant stored therein; a lubricant pump for pumping the lubricant out of the reservoir; a conduit coupled to the pump so as to dispense the lubricant; and a flat nozzle terminated to the conduit for dispensing lubricant to the dispensing is closely in contact; and
wherein further comprises a linkage having one end in contact with a sidewall of the dispensing gear, and the other end interconnected to the pump such that when the dispensing gear moves, the pump is activated so as to pump out the lubricant.

2. The automatic lubricant dispensing device as recited in claim 1, wherein a regulator is arranged between the linkage and the dispensing gear so as to adjust a distance between a joint between the linkage and the dispensing gear to a center of the dispensing gear so as to regulate the dispensing quantity of the pump.

3. The automatic lubricant dispensing device as recited in claim 1, wherein the guiding arrangement includes a chassis moveably mounted onto a guiding slot of the bracket; the pair of guiding rollers are mounted onto a pair of transaxles on the chassis, wherein the guiding rollers and the dispensing gear are coplanar.

4. The automatic lubricant dispensing device as recited in claim 3, wherein the chassis further includes an idle roller arranged horizontally and which abuts against to a sidewall of the rack so as to keep an intimate contact between the dispensing gear and the rack.

5. The automatic lubricant dispensing device as recited in claim 3, wherein the bracket and the chassis are arranged with an adjusting device therebetween so as to regulate the distance between the pair of rollers and the dispensing gear making the guiding rollers in closely contact with a bottom surface of the rack so as to keep the dispensing gear and the rack in close relationship.

6. The automatic lubricant dispensing device as recited in claim 5, wherein the adjusting device is a rubber band of heavy duty.

7. The automatic lubricant dispensing device as recited in claim 5, wherein the chassis is provided with a handle so as to maneuver the chassis manually.

8. An automatic lubricant dispensing device, comprising:
a bracket;
a lubricant supplying device mounted on a first end of the bracket;
a dispensing gear disposed on a second end of the bracket;
a guiding arrangement moveably mounted on the bracket, and including a pair of guiding rollers arranged coplanarly;
wherein a space is defined between the dispensing gear and the pair of guiding rollers in which a rack to be lubricated can fit therein, and the dispensing gear is adapted to mesh with the rack to be lubricated;
wherein the lubricant supplying device includes a lubricant reservoir with lubricant stored therein; a lubricant pump for pumping the lubricant out of the reservoir; a conduit coupled to the pump so as to dispense the lubricant; and a flat nozzle terminated to the conduit for dispensing lubricant to the dispensing gear for which is closely in contact;
wherein the lubricant supplying device evenly dispenses the lubricant over teeth of the rack by the dispensing gear which is properly meshed with the rack; and
wherein comprises a linkage having one end in contact with a sidewall of the dispensing gear, and the other end interconnected to the pump such that when the dispensing gear moves, the pump is activated so as to pump out the lubricant.

9. The automatic lubricant dispensing device as recited in claim 8, wherein a regulator is arranged between the linkage and the dispensing gear so as to adjust a distance between a joint between the linkage and the dispensing gear to a center of the dispensing gear so as to regulate the dispensing quantity of the pump.

10. The automatic lubricant dispensing device as recited in claim 9, wherein the guiding arrangement includes a chassis moveably mounted onto a guiding slot of the bracket; the pair of guiding rollers are mounted onto a pair of transaxles on the chassis, wherein the guiding rollers and the dispensing gear are coplanar.

11. The automatic lubricant dispensing device as recited in claim 10, wherein the chassis further includes an idle roller arranged horizontally and which abuts against to a sidewall of the rack so as to keep an intimate contact between the dispensing gear and the rack.

12. The automatic lubricant dispensing device as recited in claim 11, wherein the bracket and the chassis are arranged with an adjusting device therebetween so as to regulate the distance between the pair of rollers and the dispensing gear making the guiding rollers in closely contact with a bottom surface of the rack so as to keep the dispensing gear and the rack in close relationship.

13. The automatic lubricant dispensing device as recited in claim 12, wherein the adjusting device is a rubber band of heavy duty.

14. The automatic lubricant dispensing device as recited in claim 13, wherein the chassis is provided with a handle so as to maneuver the chassis manually.

15. An automatic lubricant dispensing device, comprising:
a bracket;
a lubricant supplying device mounted on a first end of the bracket;
a dispensing gear disposed on a second end of the bracket;
a guiding arrangement moveably mounted on the bracket, and including a chassis moveably mounted onto a guiding slot of the bracket; a pair of guiding rollers are mounted onto a pair of transaxles on the chassis, wherein the guiding rollers and the dispensing gear are coplanar;
wherein a space is defined between the dispensing gear and the pair of guiding rollers in which a rack to be lubricated can fit therein, and the dispensing gear is adapted to mesh with the rack to be lubricated; and
wherein the lubricant supplying device evenly dispenses a lubricant over teeth of the rack by the dispensing gear which is properly meshed with the rack;
wherein the lubricant supplying device includes a lubricant reservoir with the lubricant stored therein; a lubricant pump for pumping the lubricant out of the reservoir; a conduit coupled to the pump so as to dispense the lubricant; and a flat nozzle terminated to the conduit for dispensing lubricant to the dispensing is closely in contact; and
wherein further comprises a linkage having one end in contact with a sidewall of the dispensing gear, and the other end interconnected to the pump such that when the dispensing gear moves, the pump is activated so as to pump out the lubricant; and wherein a regulator is arranged between the linkage and the dispensing gear so as to adjust a distance between a joint between the linkage and the dispensing gear to a center of the dispensing gear so as to regulate the dispensing quantity of the pump.

* * * * *